(12) United States Patent
Graham et al.

(10) Patent No.: US 11,500,573 B2
(45) Date of Patent: Nov. 15, 2022

(54) MULTIPLE INTERFACE DATA EXCHANGE APPLICATION FOR USE IN PROCESS CONTROL

(71) Applicant: ExxonMobil Technology and Engineering Company, Annandale, NJ (US)

(72) Inventors: Christopher W. Graham, Kingwood, TX (US); David L. Patin, Kingwood, TX (US); Alistair Henderson, Northhamptonshire (GB); Mark Fisher, Milton Kevnes (GB)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 12 days.

(21) Appl. No.: 16/953,605

(22) Filed: Nov. 20, 2020

(65) Prior Publication Data

US 2021/0181970 A1 Jun. 17, 2021

Related U.S. Application Data

(60) Provisional application No. 62/947,260, filed on Dec. 12, 2019.

(51) Int. Cl.
*G06F 3/06* (2006.01)

(52) U.S. Cl.
CPC .......... *G06F 3/0652* (2013.01); *G06F 3/061* (2013.01); *G06F 3/062* (2013.01); *G06F 3/0653* (2013.01); *G06F 3/0683* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,893,117 A * 4/1999 Wang ................. G06F 16/2329
707/999.203
10,990,490 B1 * 4/2021 Brooks ............... G06F 16/1844
(Continued)

OTHER PUBLICATIONS

EKI-1228/CI/I-DR 8-port Modbus Gateway; Advantech; Mar. 17, 2020; retrieved from https://advdownload.advantech.com/productfile/PIS/EKI-1228-DR/file/EKI-1228_CI_I-DR_DS(031720)20200319163431.pdf on Jan. 26, 2022 (Year: 2020).*
(Continued)

*Primary Examiner* — Daniel C. Chappell
(74) *Attorney, Agent, or Firm* — Vorys, Sater, Seymour and Pease LLP

(57) ABSTRACT

A multiple interface data exchange system utilizes a persistent in-memory storage in asynchronous data communication with a plurality of interfaces. Each interface is configured to communicate with at least one application using a particular communication protocol. The persistent in-memory storage stores tuple data sets received from applications transmitting data to the connected interface in a canonical (universal) format, automatically creating new tuples and updating existing tuples. The canonical format of the data is quickly queried in the persistent in-memory storage and available to other applications in connection with the multiple interface data exchange system regardless of the communication protocol used by a requesting application.

17 Claims, 2 Drawing Sheets

(58) Field of Classification Search
CPC ............... G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 17/00–40; G06F
21/00–88; G06F 2009/3883; G06F
2009/45562–45595; G06F 2015/761–768;
G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153; G06K 9/00–6298; G06N
3/00–126; G06N 5/00–048; G06N
7/00–08; G06N 10/00; G06N 20/00–20;
G06N 99/00–007; G11B 20/00–24; G11B
33/00–1493; G11C 7/00–24; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 27/00–3293; H01L
2225/00–1094; H04L 9/00–38; H04L
12/00–66; H04L 41/00–5096; H04L
49/00–9094; H04L 61/00–6095; H04L
67/00–42
See application file for complete search history.

(56) References Cited

U.S. PATENT DOCUMENTS

2012/0303577 A1* 11/2012 Calder .................. G06F 16/278
707/613
2013/0282965 A1* 10/2013 Sengupta ............ G06F 12/0866
711/104
2021/0326223 A1* 10/2021 Grunwald ............. G06F 16/178

OTHER PUBLICATIONS

C. R. Taylor, C. A. Shue and N. R. Paul, "A deployable SCADA authentication technique for modern power grids," 2014 IEEE International Energy Conference (ENERGYCON), 2014, pp. 696-702, doi: 10.1109/ENERGYCON.2014.6850502. (Year: 2014).*
EKI-1221I-MT 1-port Modbus Gateway with Fiber and WT, EKI-1222I-SC 2-port Modbus Gateway with Fiber and WT; Advantech; Feb. 27, 2020 retrieved from https://advdownload.advantech.com/productfile/PIS/EKI-1221I-MT/file/EKI-1221I-MT_1222I-SC_DS(022720)20200722193160.pdf on Jan. 26, 2022 (Year: 2020).*
Definition of "canonical"; Merriam-Webster Dictionary; Sep. 5, 2016; retrieved from https://www.merriam-webster.com/dictionary/canonical on Mar. 23, 2022 (Year: 2016).*
V. Vijaya, R. Valupadasu, B. R. Chunduri, C. K. Rekha and B. Sreedevi, "FPGA implementation of RS232 to Universal serial bus converter," 2011 IEEE Symposium on Computers & Informatics, 2011, pp. 237-242, doi: 10.1109/ISCI.2011.5958920. (Year: 2011).*
F. Chang, J. Cheng, J. Yang, H. Huang and K. Mei, "Multi-channel signal processing heterogeneous microsystem based on FPGA and Application Processor," 2020 IEEE 15th International Conference on Solid-State & Integrated Circuit Technology (ICSICT), 2020, pp. 1-3, doi: 10.1109/ICSICT49897.2020.9278292. (Year: 2020).*
M. Fluet and P. Gilenberg, "Test Challenges of Multi-Gigabit Serial Buses," 2018 IEEE AUTOTESTCON, 2018, pp. 1-7, doi: 10.1109/AUTEST.2018.8532513. (Year: 2018).*
P. E. R. Lippens, J. L. van Meerbergen, W. F. J. Verhaegh and A. van der Werf, "Allocation of multiport memories for hierarchical datastreams," Proceedings of 1993 International Conference on Computer Aided Design (ICCAD), 1993, pp. 728-735, doi: 10.1109/ICCAD.1993.580169. (Year: 1993).*

* cited by examiner

MULTIPLE INTERFACE DATA EXCHANGE APPLICATION FOR USE IN PROCESS CONTROL

CROSS REFERENCE TO RELATED APPLICATIONS

The application claims priority to U.S. Provisional Application Ser. No. 62/947,260 filed Dec. 12, 2019, which is herein incorporated by reference in its entirety.

FIELD

The present disclosure relates generally to systems and methods of data exchange between disparate industrial control applications and systems supporting multiple standards based to interfaces. More particularly, the present disclosure relates to a common key/value/timestamp database for data exchange.

BACKGROUND

Industrial control systems and associated instrumentation, which include the devices, systems, networks, and controls used to operate and/or automate industrial processes are generally deployed and supported over long periods. Each component of an industrial control system generally employs a software application that supports one or more industrial data exchange protocols (i.e., communication protocols) such as MODBUS, OPC-DA, OPC-UA, SQL, etc. for exchanging various messages. The particular communication protocol defines the rules, syntax, and semantics that allow two or more entities to transmit information via any kind of variation of a physical quantity.

Many existing industrial factories and plants have deployed multiple applications for automating industrial processes that support certain protocols. It is difficult to integrate applications and instrumentation into an established automation system that use a communication protocol that differs from those already supported by the system. Oftentimes, protocol communication issues arise when attempting to use equipment from multiple vendors as each vendor of process equipment uses its preferred communication protocols. As technology progresses, new protocol standards may be adopted by vendors making communication with older applications and components using older protocols difficult.

The protocol compatibility issue may block a buyer into using only hardware components available from a single vender at a single point in time with limited opportunities to mix-and-match the "best-of-breed." Furthermore, the compatibility issue also blocks an economically feasible path to upgrade the automation systems as new and better components emerge in the market place. Current solutions for integration of applications utilizing different communication protocols typically involve the addition of a point-to-point protocol converter between each application. In situations where many applications and hardware components communicate using differing protocols, a protocol converter is needed for each communication line, thus increasing system complexity and potential failure points. Furthermore, protocol converters are limited in that communications are translated in real time between applications and the communicated data is not stored or accessible to application/devices not connected at the time of transmission. That is, the real time communication requires that both applications are operational (on-line) in a synchronous manner, wherein one application is sending data and another is listening.

SUMMARY

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with one aspect of the present disclosure, described is a multiple interface data exchange (MIDE) system. The MIDE system includes a central computer system having a processor and a memory in communication with the processor. The memory includes a persistent in-memory storage. The system also includes one or more I/O interfaces where each I/O interface utilizes a different communication protocol for communication with at least one associated application. The at least one application transmits data to an associated I/O interface and the data transmitted is stored in the persistent in-memory storage.

In some embodiments, the transmitted data is a tuple composed of a Key, a Value, and a Timestamp element. The Timestamp element may provided by the MIDE system.

In some embodiments, the transmitted data is formatted and stored in a canonical data format.

In some embodiments, the communication protocol is an industrial control system protocol.

In some embodiments, the one or more I/O interfaces further includes a security standard for authenticating communication between the central computer and at least one associated application.

The MIDE system may also include a second data storage in communication with the central computer system, wherein the in-memory persistent data storage is configured to upload a plurality of data sets stored within the in-memory persistent data storage to the second data storage.

In some embodiments, the data exchange facilitated by the MIDE system between applications of the least one application is asynchronous.

In accordance with another aspect of the present disclosure, described is an exemplary method for exchanging data between applications connected to a central computer system, each application utilizing a different communications protocol. The method includes, with a first I/O interface, receiving a first data set from a first application utilizing a first communication protocol. The method also includes, with a protocol module, formatting the first data set to a first canonical formatted data set and storing the first canonical formatted data set within a persistent in-memory storage, wherein the persistent in-memory storage is configured to store a plurality of formatted data sets.

In some embodiments, the method further includes, with a second I/O interface, transmitting the first canonical formatted data set to a second application utilizing a second communication protocol.

The method may also include, with the protocol module, formatting the first canonical formatted data set, to a data set transmittable utilizing a second communication protocol.

In some embodiments, the method further includes uploading the first canonical formatted data set in the persistent in-memory storage to a second data storage.

The method may further include purging formatted data sets from the persistent in-memory storage wherein a timestamp indicative of the age of the formatted data is older than a predetermined age.

In some embodiments, the data sets are tuples including a Key element, a Value element, and a Timestamp element, wherein if a first tuple is already in the persistent in-memory storage having a first Key, a first Value and first Timestamp, a write to the persistent in-memory storage of a second tuple having the first key, a second value, and second timestamp, updates the first tuple stored within the persistent in-memory storage with the second value and second timestamp.

In some embodiments, a tuple includes a Key element, a Value element, and a Timestamp element, wherein if a key value of a new tuple is not present in the persistent in-memory storage, a write request to the persistent in-memory storage creates a new data entry of the new tuple in the persistent in-memory storage.

In accordance with one aspect of the present disclosure, described is a system for exchanging data between applications that utilize different communications protocols. The system includes a central computer system with a processor, a first interface in communication with the processor and a first application, a second interface in communication with the processor and a second application, and a memory in communication with the processor. The memory includes a persistent in-memory storage for storing data sets received from the first interface. The memory also stores instructions that are executed by the processor to receive a first data set of a first communication protocol format from the first application transmitted utilizing a first communication protocol, convert the first data set to a first data set of a canonical data format, and store the first data set of the canonical data format within the persistent in-memory storage.

In some embodiments, the memory stores instructions to receive a data query request from the second application via the second interface. The instructions may further query the persistent in-memory storage for the requested data set.

In some embodiments, the memory stores instructions to transmit the first data set of the canonical data format to the second application via the second communication protocol.

In some embodiments, the system further includes a second data storage in communication with the central computer system, wherein the in-memory persistent data storage is configured to upload stored data sets to the second data storage.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DESCRIPTION

Figure 1:
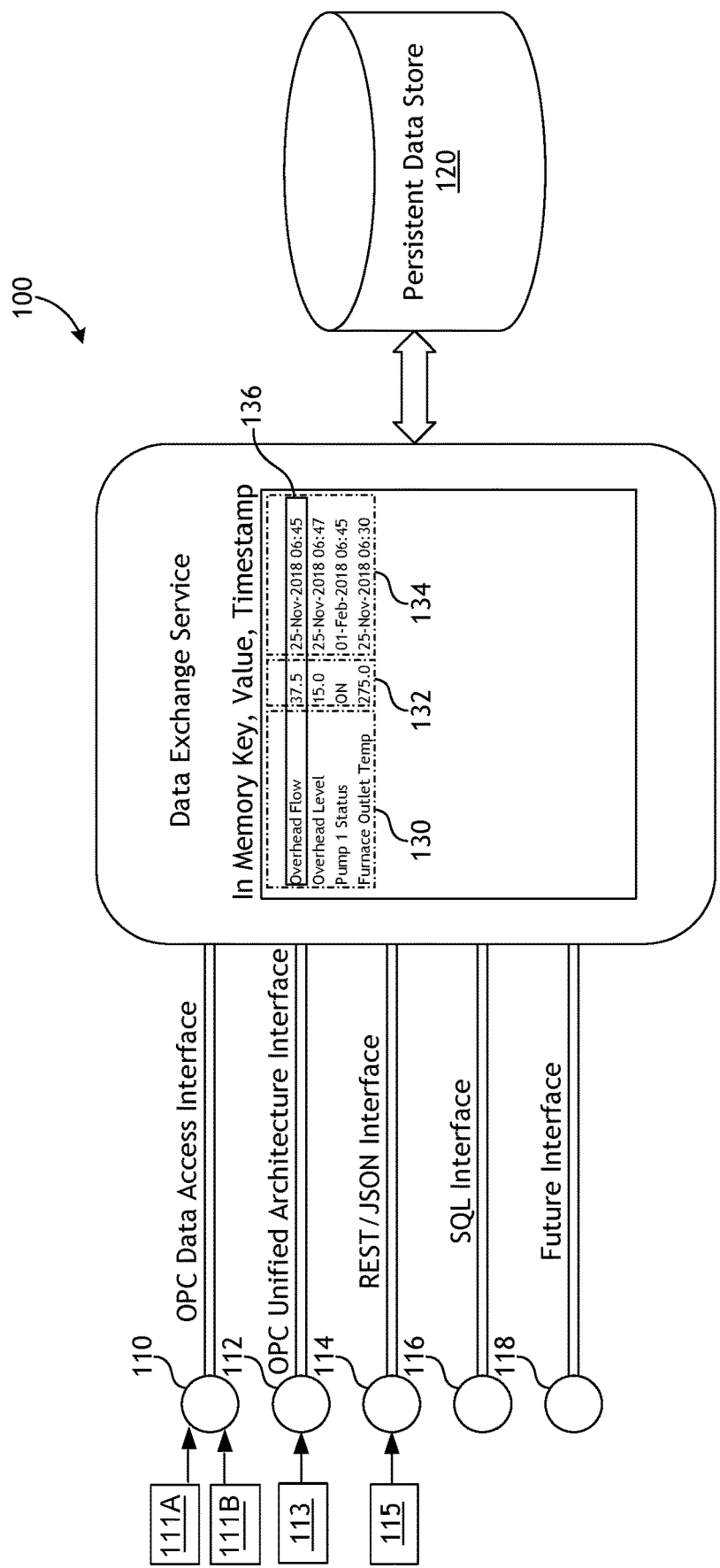
FIG. 1 is a schematic diagram of a system for multiple interface data exchange in accordance with the present disclosure

A more complete understanding of the components, processes and apparatuses disclosed herein can be obtained by reference to the accompanying drawings. These figures are merely schematic representations based on convenience and the ease of demonstrating the present disclosure, and are therefore not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" disclose the range defined by the absolute values of the two endpoints, e.g. "about 2 to about 4" also discloses the range "from 2 to 4." Generally, the terms "about" and "approximately" may refer to plus or minus 10% of the indicated number.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

As used herein, a "protocol" is a communication protocol generally including a system of rules that allow two or more entities to transmit information via any kind of variation of a physical quantity. The protocol defines the rules, syntax, and semantics. Protocols may be implemented by hardware, software, or a combination of both.

Exemplary embodiments of the present disclosure describe multiple interface data exchange systems utilizing a persistent in-memory storage in data communication with a plurality of interfaces. Each interface is configured to communicate with at least one application using a particular communication protocol. The persistent in-memory storage stores data received from applications transmitting data to the connected interface in a canonical (universal) format. The canonical format of the data is quickly queried in the persistent in-memory storage and available to other applications in connection with the multiple interface data exchange system regardless of the communication protocol used by a requesting application. The multiple interface data exchange systems disclosed herein are capable of asynchronous communication between applications communicating with different protocols because the data sets are stored ("deposited") within a resident memory structure.

Referring now to FIG. 1, there is shown an exemplary schematic of a system 100 configured for multiple interface data exchange (MIDE). It will be appreciated that the various components depicted in FIG. 1 are for purposes of illustrating aspects of the exemplary embodiment and that other similar components, implemented via hardware, software, or a combination thereof, are capable of being substituted therein.

Figure 2:
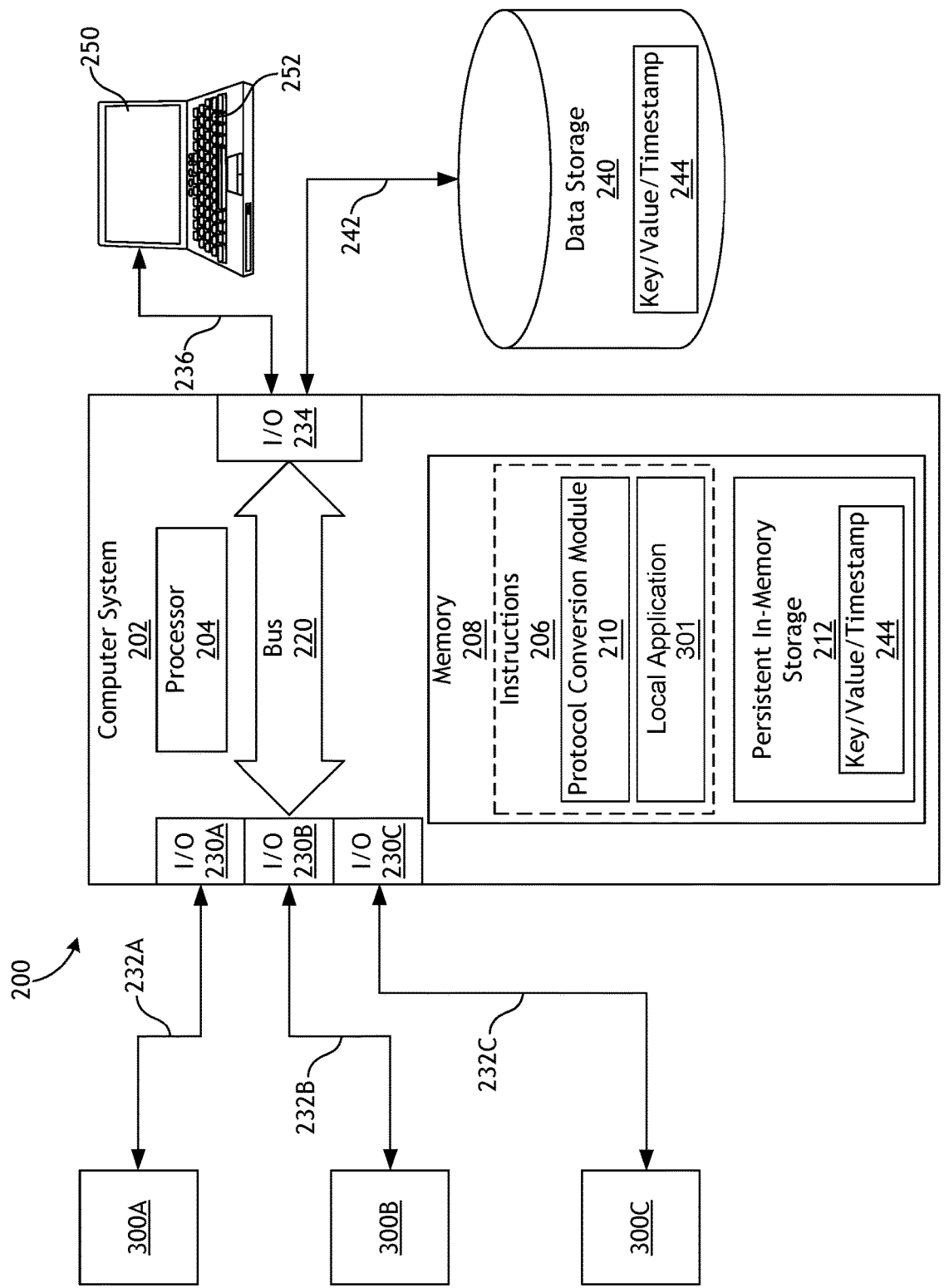
FIG. 2 is a functional block diagram of a system for multiple interface data exchange in accordance with the present disclosure.

The MIDE system 100 may be implemented on a computer operating system, for example and without limitation, a Microsoft Windows operating system of a computer system, such as computer system 202 of FIG. 2. The MIDE system 100 is configured to, upon startup, establish connection with and host one or more interfaces 110, 112, 114, 116, 118 each associated with a data exchange (communication) protocol. The one or more interfaces 110, 112, 114, 116, 118 allow multiple independent control applications 111, 113, 115 to read and write a set of information (a data set which may be shared amongst all control applications connected to the system 100, i.e., with other software applications that manage and/or control various equipment, sensors, instrumentation and the like). While five interfaces are illustrated in FIG. 1 and described herein, it is to be understood that the number of interfaces is not limited to five. For example, interface 118 is representative of an interface related to a communications protocol that may be developed in the future. Furthermore, it is to be understood that more than one application may communicate with an interface, e.g., applications 111A and 111B simultaneously communicating with interface 110, As used herein, an "interface" is more than just the communications protocol used between the MIDE system 100 and an application 111, 113, 115 via the transmission of data on a wire. Each interface has its own data-encoding format that supports its specific protocol. An "interface" also includes the authentication/security mechanism specified by the standards of the communication protocol. That is, each communication protocol includes a security standard associated therewith that authenticates and facilities the data exchange. For example, the OPC-Data Access interface 110 uses MS DCOM security specifications for authenticating communication and the OPC-United Architecture interface 112 uses a certificate exchange security. In other words, each data exchange protocol interface 110, 112, 114, 116, 118 implements the connection and security mechanisms specified by their respective standards.

The MIDE system 100 facilitates a common data exchange between the applications 111, 113, 115 connected via interfaces 110, 112, 114, 116, 118. In some embodiments, each interface receives a data set 136 structure including a Key 130, a Value 132, and a Timestamp 134. That is, each interface 110, 112, 114, 116, 118 presents a single table, vector, and/or data set composed of at least one element. In the exemplary embodiment for FIG. 1, the data set 136 is a tuple, composed of three elements [Key, Value, Timestamp]. Each data set 136 is collected by the MIDE system 100 and stored in the resident memory. The data set 136 is translated from the communication protocol in which it was transmitted to a canonical data format that is easily queried and able to be packaged for transmission at any time to other applications of the MIDE system 100 upon request.

When an application e.g., application 111 via an interface (e.g., interface 110), requests to write a data set 136 to the resident memory of the MIDE system 100, the data set 136, containing at least a Key 130 and Value 132, is transmitted along the communication line utilizing a particular communication protocol, e.g., OPC-DA of interface 110. The data set 136 is translated and stored in the resident memory in a canonical format. When a connected application, e.g., application 113 via a different interface (e.g., interface 112), makes a request for the data set 136 supplied to the MIDE System 100 via interface 110, the MIDE system 100 transmits the requested canonical formatted data set 136 to the application 113 via the particular communication protocol, e.g. OPC-UA, of that interface 112.

The MIDE System 100 is analogous to a mailbox of data sets (tuples) 136. An application 111 (generally associated with process or component of an automation system) transmits a data set 136 to the resident memory of the MIDE system 100. The resident memory stores the transmitted data for a predetermined length of time. At any time, a second application 113 is able to request the data set 136 stored in the resident memory. In this way, the first application 111 and second application 113 do not need to be in direct communication with each other. The data set 136 is simply "deposited" at a central location within the resident memory (the "mailbox") and is available for an application, or multiple applications, to access ("pick-up") the stored information. It is noted that MIDE system 100 ("mailbox") is not a simple protocol converter that only provides communication between two applications that are synced, i.e., connected at the same time. Protocol converters do not store data sets any longer than it takes to transmit the data set to the requesting/listening entity. In other words, the MIDE system 100 is advantageous as it allows for asynchronous communication between applications communicating with different protocols because the data sets are stored ("deposited") within a resident memory structure.

As a non-limiting illustrative example, application 111 may control a sensor and provide the sensor data in the form of a tuple 136 to the MIDE System 100 via interface 110. The tuple may include a string for sensor identification (Key 130), a value of the sensor (Value 132), and a timestamp associated with the measured value (Timestamp 134). A second application 113 that utilizes a communication protocol different from application 111 may need the information of the tuple 136 in order to control a piece equipment in response to a reading by the sensor controlled by application 111. However, direct communication between the applications 111 and 113 may be impractical, economically or otherwise, e.g., the communication protocol used by each are different. The second application 113 sends a read request to the MIDE System 100 for the particular tuple 136 to which the MIDE system 100 queries the resident memory and provides the requested data set 136 via the interface 112. A third application 115 that uses yet another communication protocol, e.g., representational state transfer (REST) JavaScript object notation (JSON), is also able to access the same stored data set, tuple 136, by sending a another request at any time to the MIDE System 100. The MIDE system 100 queries the resident memory for the requested data set and supplies it to the requesting application 115 via the interface 114, using the REST/JSON communication protocol.

In some embodiments, the MIDE System 100 includes a persistent data store 120 for storing data sets uploaded from the resident memory. That is, periodically, the resident memory is configured to upload the contents in the persistent in-memory storage to the persistent data store 120 as a backup. Thus, if the MIDE system 100 shuts down, e.g., for a power failure, a software update or the like and later restarts, the resident memory loads the data sets from the last known back up in the persistent data store 120 to the persistent in-memory storage.

Referring to FIG. 2, there is shown another exemplary system 200 configured for multiple interface data exchange (MIDE). It will be appreciated that the various components depicted in FIG. 2 are for purposes of illustrating aspects of the exemplary embodiment, and that other similar components, implemented via hardware, software, or a combination thereof, are capable of being substituted therein.

As shown in the exemplary embodiment of FIG. 2, the MIDE system 200 includes a central control system represented generally as the central computer system 202, which is capable of implementing the exemplary method(s) described below. The exemplary computer system 202 includes a digital processor 204, which performs the exemplary method(s) by the execution of processing instructions 206 that are stored in the resident memory 208 connected to the processor 204, as well as controlling the overall operation of the computer system 202. The central computer system 202 may be variously embodied and can include a computer server, workstation, personal computer, cellular telephone, tablet computer, pager, combination thereof, or other computing device capable of executing instructions for performing the exemplary method.

The digital processor 204 can be variously embodied, such as by a single core processor, a dual core processor (or more generally by a multiple core processor), a digital processor and cooperating math coprocessor, a digital controller, or the like. The digital processor 204, in addition to controlling the operation of the computer 202, executes instructions 206 stored in memory 208 for performing the method set forth hereinafter. In some embodiments, the processor 204 and memory 208 may be combined in a single chip.

The instructions 206 include a protocol/security module 210 that is configured to receive read and write requests from applications 300A-300C that are connected to the MIDE system 200 and translate incoming and outgoing messages containing data sets. The resident memory 208 also includes a persistent in-memory storage 212 configured to store data sets received from applications 300A-300C that are translated to a canonical format by the protocol/security module 210. Accordingly, the MIDE system 200 enables the creation of resident memory structure 212 that allows multiple connected applications 300A-C to exchange data sets regardless of the communication protocol used by a particular application and whether or not an application is actively listening for transmissions of data. It is to be understood that while only three connected applications 300A-C are illustrated, the number of connected applications is non-limiting, i.e., there could be any number of applications, including more or less than three applications.

The various components of the computer system 202 associated with the central system 200 may all be connected by a data/control bus 220. The processor 204 of the computer system 202 is in communication with a second data storage 240 via a link 242. A suitable communications link 242 may include, for example, the public switched telephone network, a proprietary communications network, infrared, optical, or other suitable wired or wireless data communications. The second data storage 240 is capable of implementation on components of the computer system 202, i.e., on hard drives, virtual drives, or the like, or on remote memory accessible to the computer system 202. In some embodiments, the second data storage 240 stores data sets that are uploaded from the resident memory 208. That is, periodically, the resident memory 208 is configured to upload the contents in the persistent in-memory storage 212 (e.g., data sets 244) to the second data storage 240 as a backup. Thus, if the computer system 202 shuts down, e.g., for a power failure, a software update or the like and later restarts, the resident memory 208 loads the data sets 244 from the last known back-up in the second data storage 240 to the persistent in-memory storage 212.

In some embodiments, the MIDE System 200 is configured to exchange data sets between applications (300A-C) in the form of tuples. The tuple information 244 may include, for example, a key, value and timestamp, such as the key 130, Value 132, and timestamp 134 described above in relation to FIG. 1 and as described in greater detail below. The data sets 244 are collected by the central computer system 202 from the applications 300A-300C, via I/O interfaces 230A-230C, respectively. A Key is generally a sequence of characters (string) that relates to the value information. A Value, for purposes of describing the information of a tuple, is a scalar or logic term.

For example and without limitation, a Key may identify a certain sensor, e.g., Temperature Sensor 1, and the Value relating to that tuple may be a unit-less numerical value of the temperature, e.g. 23. That is, the Key may serve as an identifier of a particular Value of a quantity. In some embodiments, the Value is a Boolean logic term having one of two possible values e.g., true/false, on/off, up/down, etc. For example and without limitation, a Boolean term for the Value portion of a tuple is ON or OFF indicating that a certain pierce of instrumentation on a process line is either "on" or "off" The Timestamp portion of the tuple is a sequenced of characters or encoded information identifying when a certain event occurred, usually giving a date and time of days accurate to a small fraction of a second. For the purposes of a tuple, the Timestamp is generally related to the Value and Key. In some embodiments, a timestamp is provided by the computer system 202 at the time that a write request from an application was received, or the time the data is actually stored in the persistent in-memory storage 212. In other embodiments, the Timestamp is provided by a connected application, e.g., application 300A along with the transmitted Key and Value elements. In yet still other embodiments, an operator of the computer system 202 via user input device 252 provides the Timestamp.

The exemplary computer system 202 includes one or more input/output (I/O) interface devices 230A-C and 234 for communicating with external devices and applications 300A-C. The I/O interface 234 communicates via communications link 236, with a display device 250 for displaying information such as a listing of tuples (illustrated in FIG. 1), and a user input device 252, e.g., a keyboard, for communicating user input information and command selections to the processor 204. The user input device 252 may also be used for entering and/or editing data sets 244 stored in the resident memory storage 212, e.g., entering a key/value/timestamp of a measurement performed by an operator in a lab. The I/O interface 230A-C communicates with external applications 300A-300C via communications links 232A-C known in the art e.g., wired connections, a computer network, the Internet, an Intranet, and the like.

Each interface 230A-C is configured to utilize a particular communication protocol to facilitate communication between an application 300A-C and the computer system 202 via the transmission of data on communications links 232A-C. Each interface 230A-C is also configured to include an authentication/security mechanism specified by the standards of the particular communication protocol. As described above, each communication protocol has a security standard associated therewith that facilitates the data exchange between the application and computer system 202. In other words, each data exchange protocol interface 230A-C implements the communication language and security mechanisms specified by each protocol standard.

A variety of different communication protocols are used in different technological fields such as power generation, transmission and distribution, oil and gas, automation, utilities, and remote monitoring. In some embodiments, the communications protocol utilized by an application 300A-C is an industrial control system protocol including but not limited to OPC-DA, OPC-UA, OMG DDS, REST/JSON, SQL, Ethernet/IP, and the like. In other embodiments, the communications protocol utilized by an application 300A-C is a building automation protocol, including but not limed to BACKNET, and the like. In other embodiments, the communications protocol utilized by an application 300A-C is a process automation protocol including but not limited to Ethernet/IP, CIP, and the like. In yet still other embodiments, the communications protocol is any known protocol or protocol yet to be developed including communications protocol for non-industrial settings, for example and without limitation Internet of Things (IoT) protocols.

As shown in the exemplary embodiment of FIG. 2, one or more external applications 300A-300C may be in data communication with the central computer system 202 via respective communication links 332A-C. The data communications links 332A-C between the central computer system 202 and the applications 300A-200C may be accomplished via any suitable channel of data communications such as wired or wireless communications, for example, 802.11a, 802.11b, 802.11g, 802.11(x), or any suitable wireless data transmission system, or wired communications.

As shown in the exemplary embodiment of FIG. 2, the applications 300A-300C are capable of intermittent (opportunistic) or continuous bi-directional communication with the central computer system 202 utilizing each associated I/O interface 230A-C. The applications 300A-300C each provide data sets along its associated communication link 232A-C utilizing a particular communication protocol to the central computer system 202 when an application 300A-300C requests to write to the persistent in-memory storage 212. The protocol conversion module 210 receives the incoming data set from each interface 230A-C and translates the data set associated with the read and write requests. That is, the protocol conversion module 210 receives the data set from a particular interface utilizing a specific communications protocol and translates the data set to a canonical ("universal") data format for storage in the persistent in-memory storage 212. The protocol conversion module 210 is also configured to receive a read request from an application 300A-C and query the persistent in-memory storage 212 for a stored data set as well as transmit the requested data set back to the requesting application. In transmitting the requested data set back, the protocol conversion module 210 translates the stored data set from the canonical format to the communication protocol of the requesting application. The translated data set is transmitted to the requesting application through the associated interface. It is to be appreciated that since data sets are stored in the persistent in-memory storage 212, the process of data query is very fast when compared to searching for data sets in a database located on a hard-disk drive, e.g., external storage 240.

In some embodiments and with continued reference to FIG. 2, an application and interface are local to the computer system 202. For example, a local application 301 running on the computer system 202 may use communications internal to the computer system 202 to communicate with the MIDE system 200. That is, the Local Application 301 may write to, request data from, and query the Persistent In Memory Storage 212.

Another advantage of storing data sets in the persistent in-memory storage 212 is that a write request may simply populate the persistent in-memory storage without a specific command and/or format that is otherwise needed to update a database table. For example, if a certain data set tuple, having a Key (identifier) is already in the storage structure, a write to the persistent in-memory storage 212 with the same Key, simply updates the value and timestamp associated with that particular Key. If the Key is not already present, a write request automatically creates a new data entry in the persistent in-memory storage 212. As will be appreciated, this forgoes the need to build separate methods to add tuples to the service.

In some embodiments, the system 200 is configured or otherwise programmed to measure the staleness of a data set entry located in the persistent in-memory storage 212 as the data set includes a timestamp element. The timestamp is reviewed by the processor 204 and if the timestamp indicates that the data set entry is older than a predetermined threshold, the data set entry is automatically purged from the persistent in-memory storage 212. In some embodiments, the data set entry to be purged from the persistent in-memory storage is uploaded and stored in the second data storage 240. For example and without limitation, the system 200 may be configured to purge data set entries that are older than 30 days. In this way, data set entries that may no longer have temporal relevance are removed, freeing up space in the persistent in-memory storage 212.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art, which are also intended to be encompassed by the following claims.

Embodiments Listing

The present disclosure provides, among others, the following embodiments, each of which may be considered as optionally including any alternate embodiments.

Clause 1. A multiple interface data exchange (MIDE) system that includes a central computer system comprising a processor, a memory in communication with the processor, the memory comprising a persistent in-memory storage, and one or more I/O interfaces, each I/O interface utilizing a different communication protocol for communication with at least one associated application, wherein the at least one application transmits data to an associated I/O interface and the transmitted data is stored in the persistent in-memory storage.

Clause 2. The MIDE system according to Clause 1, wherein the transmitted data is a tuple comprising a Key, a Value, and a Timestamp element.

Clause 3. The MIDE system according to Clause 2, wherein the Timestamp element is provided by the MIDE system.

Clause 4. The MIDE system according to any of the preceding Clauses, wherein the transmitted data is formatted and stored in a canonical data format.

Clause 5. The MIDE system according to any of the preceding Clauses, wherein the communication protocol is an industrial control system protocol.

Clause 6. The MIDE system according to any of the preceding Clauses, wherein the one or more I/O interfaces further includes a security standard for authenticating communication between the central computer and at least one associated application.

Clause 7. The MIDE system according to any of the preceding Clauses, further comprising a second data storage in communication with the central computer system, wherein the in-memory persistent data storage is configured to upload a plurality of data sets stored within the in-memory persistent data storage to the second data storage.

Clause 8. The MIDE system according to any of the preceding Clauses, wherein data exchange facilitated by the MIDE system between applications of the least one application is asynchronous.

Clause 9. A method for exchanging data between applications connected to a central computer system and each utilizing a different communications protocol, the method including with a first I/O interface, receiving a first data set from a first application utilizing a first communication protocol, with a protocol module, formatting the first data set to a first canonical formatted data set, and storing the first canonical formatted data set within a persistent in-memory storage, wherein the persistent in-memory storage is configured to store a plurality of formatted data sets.

Clause 10. The method according to Clause 9, further comprising with a second I/O interface, transmitting the first canonical formatted data set to a second application utilizing a second communication protocol.

Clause 11. The method according to Clause 9 or Clause 10, further comprising with the protocol module, formatting the first canonical formatted data set, to a data set transmittable utilizing a second communication protocol.

Clause 12. The method according to any of Clauses 9 through 11, further comprising uploading the first canonical formatted data set in the persistent in-memory storage to a second data storage.

Clause 13. The method according to any of Clauses 9 through 12, wherein the plurality of formatted data sets each comprise a Timestamp, the method further including purging formatted data sets from the persistent in-memory storage wherein the Timestamp indicative of the age of the formatted data is older than a predetermined age.

Clause 14. The method according to any of Clauses 9 through 13, the data set further comprising a tuple including a Key element, a Value element, and a Timestamp element, wherein if a first tuple is already in the persistent in-memory storage having a first Key, a first Value and first Timestamp, a write to the persistent in-memory storage of a second tuple having the first key, a second value, and second timestamp, updates the first tuple stored within the persistent in-memory storage with the second value and second timestamp.

Clause 15. The method according to any of Clauses 9 through 13, the data set further comprising a tuple including a Key element, a Value element, and a Timestamp element, wherein if a key value of a new tuple is not present in the persistent in-memory storage, a write request to the persistent in-memory storage creates a new data entry of the new tuple in the persistent in-memory storage.

Clause 16. A system for exchanging data between applications that utilize different communications protocols, including a central computer system comprising a processor, a first interface in communication with the processor and a first application, a second interface in communication with the processor and a second application, and a memory in communication with the processor and including a persistent in-memory storage for storing data sets received from the first interface, the memory also storing instructions that are executed by the processor to receive a first data set of a first communication protocol format from the first application transmitted utilizing a first communication protocol, convert the first data set to a first data set of a canonical data format, and store the first data set of the canonical data format within the persistent in-memory storage.

Clause 17. The system according to Clause 16, the memory storing instructions which are executed by the processor to receive a data query request from the second application via the second interface.

Clause 18. The system according to Clause 17, the memory storing instructions which are executed by the processor to further query the persistent in-memory storage for the requested data set.

Clause 19. The system according to any of Clauses 16 through 18, the memory storing instructions which are executed by the processor to transmit the first data set of the canonical data format to the second application via the second communication protocol.

Clause 20. The system according to any of Clauses 16 through 19, further comprising a second data storage in communication with the central computer system, wherein the in-memory persistent data storage is configured to upload stored data sets to the second data storage.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A multiple interface data exchange (MIDE) system comprising:
    a central computer system comprising:
        a processor;
        a memory in communication with the processor, the memory comprising a persistent in-memory storage; and
        one or more I/O interfaces, each I/O interface utilizing a different communication protocol for communication with at least one associated application,
            wherein the at least one application transmits data to an associated I/O interface and the transmitted data is stored in the persistent in-memory storage,
            wherein the transmitted data is formatted and stored using a canonical data format, the canonical data format universally accessible regardless of a communication protocol type and comprising a tuple having a key, a value, and a timestamp, and wherein a data exchange facilitated by the MIDE system between applications of the at least one application uses the canonical data format and is asynchronous.

2. The MIDE system according to claim 1, wherein the Timestamp element is provided by the MIDE system.

3. The MIDE system according to claim 1, wherein the communication protocol is an industrial control system protocol.

4. The MIDE system according to claim 1, wherein the one or more I/O interfaces further includes a security standard for authenticating communication between the central computer and at least one associated application.

5. The MIDE system according to claim 1, further comprising a second data storage in communication with the central computer system, wherein the in-memory persistent data storage is configured to upload a plurality of data sets stored within the in-memory persistent data storage to the second data storage.

6. A method for exchanging data between applications connected to a central computer system and each utilizing a different communications protocol, the method comprising:
    with a first I/O interface, receiving a first data set from a first application utilizing a first communication protocol;
    with a protocol module, formatting the first data set using a canonical data format to create a first canonical formatted data set, the canonical data format universally accessible regardless of a communication protocol type and comprising a tuple having a key, a value, and a timestamp, and wherein a data exchange facilitated by the MIDE system between applications of the at least one application uses the canonical data format and is asynchronous; and
    storing the first canonical formatted data set within a persistent in-memory storage, wherein the persistent in-memory storage is configured to store a plurality of formatted data sets.

7. The method according to claim 6, further comprising:
    with a second I/O interface, transmitting the first canonical formatted data set to a second application utilizing a second communication protocol.

8. The method according to claim 6, further comprising:
    with the protocol module, formatting the first canonical formatted data set, to a data set transmittable utilizing a second communication protocol.

9. The method according to claim 6, further comprising uploading the first canonical formatted data set in the persistent in-memory storage to a second data storage.

10. The method according to claim 6, wherein the plurality of formatted data sets each comprise a Timestamp, the method further including purging formatted data sets from the persistent in-memory storage wherein the Timestamp indicative of the age of the formatted data is older than a predetermined age.

11. The method according to claim 6, wherein if a first tuple is already in the persistent in-memory storage having a first Key, a first Value, and a first Timestamp, a write to the persistent in-memory storage of a second tuple having the first key, a second value, and second timestamp, updates the first tuple stored within the persistent in-memory storage with the second value and second timestamp.

12. The method according to claim 6, wherein if a key value of a new tuple is not present in the persistent in-memory storage, a write request to the persistent in-memory storage creates a new data entry of the new tuple in the persistent in-memory storage.

13. A system for exchanging data between applications that utilize different communications protocols, comprising:
    a central computer system comprising:
    a processor;
    a first interface in communication with the processor and a first application;
    a second interface in communication with the processor and a second application; and
    a memory in communication with the processor and including a persistent in-memory storage for storing data sets received from the first interface, the memory also storing instructions that are executed by the processor to:
    receive a first data set of a first communication protocol format from the first application transmitted utilizing a first communication protocol;
    convert the first data set to a formatted first data set use a canonical data format, the canonical data format universally accessible regardless of communication protocol type and comprising a tuple having a key, a value, and a timestamp, wherein a data exchange facilitated by the MIDE system between applications of the at least one application is asynchronous and transmits the formatted first data set using the canonical data format; and store the first data set of the canonical data format within the persistent in-memory storage.

14. The system according to claim 13, the memory storing instructions which are executed by the processor to receive a data query request from the second application via the second interface.

15. The system according to claim 14, the memory storing instructions which are executed by the processor to further query the persistent in-memory storage for the requested data set.

16. The system according to claim 13, the memory storing instructions which are executed by the processor to transmit the first data set of the canonical data format to the second application via the second communication protocol.

17. The system according to claim 13, further comprising a second data storage in communication with the central computer system, wherein the in-memory persistent data storage is configured to upload stored data sets to the second data storage.

* * * * *